United States Patent Office 3,277,477
Patented Oct. 4, 1966

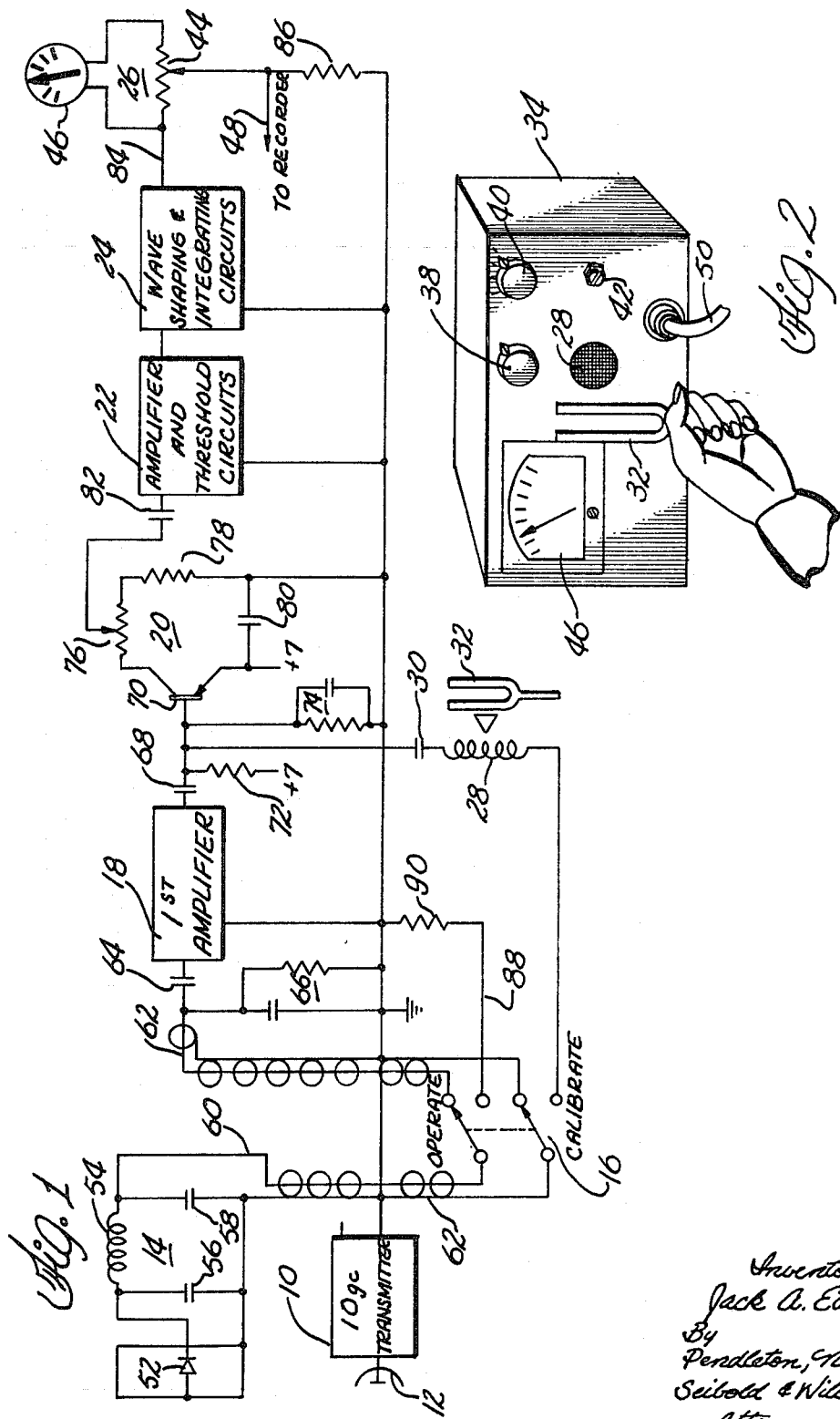

3,277,477
DOPPLER APPARATUS
Jack A. Evans, Decatur, Ill., assignor to American Radar Corporation, Decatur, Ill., a corporation of Arkansas
Filed June 2, 1964, Ser. No. 371,939
6 Claims. (Cl. 343—17.7)

This invention relates to Doppler apparatus and more particularly to improved means for calibrating Doppler apparatus. The invention is especially useful with so-called traffic radar and will be described in detail hereinafter as applied to one specific traffic radar apparatus. It will be apparent from the description that the invention may be employed with other apparatus with only minor variations, some of which will be suggested hereinafter.

In regulating automotive traffic, it is common to employ devices which are generally termed "traffic radar." The devices rely upon the Doppler effect and transmit a continuous high-frequency signal which is reflected from a moving vehicle, the reflected wave having a frequency different from that of the transmitted wave and the difference frequency bearing a known relationship to vehicle velocity.

The devices are usually mounted in and on police vehicles and are designed to operate from conventional battery supplies. The police vehicle is usually positioned adjacent a relatively straight highway section, and the antenna of the traffic radar directs a concentrated beam of high-frequency energy generally parallel to the monitored highway and in the direction of oncoming traffic. While the beam may be directed toward departing traffic, such an arrangement is not preferred as it makes vehicle identification and apprehension more difficult.

The frequency of operation for such traffic radar systems is in the kilomegacycle range and the microwave energy is generated in a relatively simple high-frequency oscillator such as a klystron circuit. Two frequency ranges which have been used in recent years are the 2400 mc. range and the 10K mc. range. The energy from the klystron is concentrated in a narrow beam only a few degrees wide by any appropriate antenna system such as a pair of dielectric rods, a set of dipoles, a parabolic reflector or the like. The beam of energy is directed along the highway to be monitored and is reflected from an oncoming vehicle and received either by the same or an adjacent antenna.

As is now known, the reflected energy when received at the antenna has a frequency equal to the transmitted frequency plus a factor directly proportional to twice the speed of the oncoming vehicle. This frequency-changing phenomena or Doppler effect gives an exact measurement of the relative velocity of the vehicle with respect to the radar apparatus and in turn with respect to the ground provided the radar apparatus is fixed. In the typical Doppler traffic radar apparatus, the high-frequency energy is transmitted continuously and a small portion of that energy is continuously sampled in a crystal mixer or the like. The reflected energy from the moving vehicle is also applied through the receiving antenna to the same crystal mixer where an audio signal is generated having a frequency equal to the difference between the transmitted and received signals. This difference frequency is also proportional to vehicle speed in accordance with the mathematical relationship:

$$V = Cf_d / 2f_o$$

where V is the velocity of the vehicle, C is the velocity of propagation of the radar wave, approximately 186,000 miles per second, $f_o$ is the frequency of the transmitted signal, and $f_d$ is the Doppler frequency or difference frequency between the transmitted and receiving signals.

In the typical traffic radar apparatus, the audio signal produced by the detecting means is amplified and processed to generate a meter indication directly related to the frequency of the audio signal. The term "processed" includes the effects of signal-shaping circuits, limiting circuits, threshhold response circuits, and other possible variations including frequency multipliers or dividers if such expedients become desirable. In particular, a threshhold circuit is desirable and is utilized in a preferred form of the invention whereby audio signals below a predetermined level and accompanying low-level noise are automatically rejected while audio signals of sufficient magnitude to accurately operate the frequency measuring circuit are passed. Also, in a preferred form of the invention, wave-shaping and integrating circuits are employed following the threshhold circuits to select only the dominant signal, generate approixmately uniform square-wave pulses having a repetition rate equal to the frequency of the dominant signal, and integrate the synthetic or modified pulses to produce a signal directly representative of velocity.

In one preferred embodiment of the invention, the apparatus is adapted to automobile velocities in the range of 10 to 100 miles per hour. For this range of vehicle speeds, a 10,525 mc. high-frequency signal is appropriately employed, and the Doppler frequency ranges between 314 and 3140 cycles per second. The relationship between the Doppler frequency and vehicle velocity are precisely controlled by the equation set forth above. However, the indicating apparatus, either a recorder or a meter, is an analogue device and may not indicate the velocity actually corresponding to the Doppler frequency unless it has been properly calibrated. Thus, it has been the practice heretofore to place a moving body in the path of the radar beam in order to synthesize a moving vehicle and thus calibrate the indicating device.

One common practice has been for one police officer to strike a tuning fork outside of the police vehicle and hold it a short distance in front of the antenna system so that the moving tine of the tuning fork will produce reflected energy having a Doppler frequency equal to that of a vehicle moving at a known velocity, usually the speed limit in the area, or 65 miles per hour. A second officer within the vehicle checks the reading on the meter or recorder, and if the indicating device does not respond properly and indicate the standard velocity, it is adjusted either electrically or mechanically to indicate the proper relationship between meter deflection and actual vehicle velocity.

The foregoing calibration practice has involved many undesirable features. The officer was required to leave the police vehicle, exposing himself to the hazards of oncoming traffic, adverse weather conditions, and the like. The circuitry cannot be calibrated until the klystron transmitter has been completely conditioned through a warm up period, and this warm up period is generally much longer than the period required to stabilize the circuits which require calibration. In many situations, it is suggested that the apparatus be calibrated before or after each arrest, and thus leaving the car and calibrating at such times was difficult and caused delay and confusion. Furthermore, it was necessary to test and calibrate the apparatus only when all traffic was out of the field of the radar beam. Otherwise, it is possible to obtain erroneous calibration information.

It is a principal object of this invention to provide improved Doppler apparatus having greater accuracy and simplified calibration procedures.

It is another object of this invention to provide an improved Doppler radar apparatus which can be calibrated without relying upon actual transmission of high-frequency energy and without access to an antenna system which may be located remotely.

It is another object of this invention to provide an improved calibration system for traffic radar apparatus in which the apparatus can be calibrated from within the police vehicle and the antenna and transmitting circuits may be located at any remote position.

It is still a further object of this invention to provide an improved calibration system for traffic radar which employs a standard sonic source such as a tuning fork and a transducer for converting such sonic energy into audio signals appropriate for direct application to the signal processing and indicating circuits of the radar apparatus.

Further and additional objects of the invention will become manifest from a consideration of this description, the accompanying drawing, and the appended claims.

One typical traffic radar apparatus with which this invention is especially useful is that described and claimed in pending United States patent application Serial No. 153,043, filed Nov. 17, 1961, by Thomas A. Murrell and Ralph R. Henry and assigned to the same assignee as the instant application; now Patent Number 3,148,328. The calibration system of the instant invention includes a sonic signal source, a transducer for converting such sonic signals into an audio test signal, control means for applying the audio test signal to signal processing circuits within the radar apparatus, the control means also insuring that an audio signal generated in the transmitter and detector circuits will not affect the calibration, and an indicating device with means associated therewith for calibrating said indicating means in accordance with the known frequency of the sonic signal source.

For a more complete understanding of the invention, reference will now be made to the accompanying drawing wherein:

FIG. 1 is a circuit diagram partially in block form illustrating the invention; and FIG. 2 is a diagrammatic, perspective view of one traffic radar apparatus incorporating the instant invention and illustrating the manner in which calibration is effected.

Referring now to the drawing and more particularly to FIG. 1, the traffic radar apparatus includes a 10K mc. transmitter 10 having appropriate radiator means 12. The radiator 12 is illustrated as a dipole device employing a parabolic reflector. However, any appropriate means for use in the 10K mc. range may be employed. The same or a separate receiving antenna may be employed and it is required that the receiving antenna sense both a portion of the transmitted energy and energy reflected from an oncoming vehicle. Both signals are applied to a detecting circuit 14, the output of which is an audio signal representative of the difference or beat frequency between the transmitted and received signals. Any conventional detector such as a short conductor acting as a probe in a wave guide may be employed.

The audio signal may be applied through a control switch 16 to an audio amplifier 18 and to further signal-processing circuits. Such further circuits may include amplifier 20 as well as additional amplifiers and a threshold circuit 22. The threshold circuit 22 functions to block low-level noise and weak signals but to pass stronger signals to a wave-shaping and integrating circuit 24. The output of the wave-shaping and integrating circuit is in turn applied to an indicating circuit 26. All of the foregoing corresponds closely to and can be more fully understood from a consideration of the description and detailed drawing of the Murrell and Henry application Serial No. 153,043.

The radar apparatus is calibrated by actuating double pole switch 16 and upon actuation, the high-frequency receiver and detector will be disconnected from the first amplifier 18 and instead an electromechanical transducer 28 is applied through a capacitor 30 to the input of audio amplifier 20. The audio signal may be applied to the processing circuits at any desired point, the point actually depending upon the gain required for the test signal.

A tuning fork 32 generating a standard and known sonic frequency is set into vibration and held in association with transducer 28 to generate an electrical signal of the appropriate audio frequency for actuation of the subsequent circuitry and for appropriate calibration. The manner in which this is accomplished is best illustrated in FIG. 2 where the radar apparatus is shown enclosed within a cabinet or housing 34 having an indicating meter 46 disposed on the front panel thereof. The meter 46 is calibrated in vehicle velocity, usually in miles per hour, within the range of approximately 10 to 100 miles per hour. For use abroad, of course, such a system would be appropriately modified to accurately indicate in kilometers per hour. In the described embodiment, the transducer 28 is a small readily available permanent magnet speaker mounted on the face of the radar cabinet 34 and having an appropriate protective screen to pass the sonic energy from the tuning fork 32 to the transducer.

Whatever other appropriate controls for the radar apparatus may be required are either accessible on the front panel, or in the case of service adjustments and infrequently used controls, they may be disposed internally. A knob 38 on the face of the cabinet 34 controls the switch 16 which conditions the radar to "operate" or "calibrate" at the option of the operator. A knob 40 is also available on the face of the cabinet for switching between short, medium, and long range, and generally this control merely adjusts the amplification of the circuitry prior to the threshold circuit. A screwdriver adjustment 42 is shown on the face of the radar cabinet 34 and this screwdriver adjustment will control a potentiometer 44 in the radar apparatus which in turn controls both the calibration of meter 46 and any appropriate recorder which may be connected to conductor 48. A cable 50 extends from the face of the cabinet 34 and is attached to the power supply or other auxiliary components. The operation of the circuit will now be described in somewhat greater detail.

A sensing probe is located within the receiving antenna and includes a nonlinear device such as diode 52. As is well known, the nonlinear device 52 will generate a signal in the output related to the beat frequency between the transmitted and received signals and the high-frequency energy will be attenuated in a filter network including inductance 54 and capacitors 56 and 58. Thus, the signal in output conductor 60 will be substantially free of high-frequency energy and will include only the audio Doppler signal. A grounded shield 62 surrounds the conductor 60 and completes the output circuit of the detector 14.

In normal operation, double pole switch 16 is in the up or "operate" position connecting conductor 60 through conductor 62 and capacitor 64 to a first amplifier stage 18. A conventional resistance capacitance network 66 bypasses the conductor 62 to ground. The output of amplifier 18 is applied through a capacitor 68 to a transistor amplifier 20 which includes transistor 70 having a base input network including resistor 72 connected to a positive regulated voltage supply and RC network 74 connected to ground. This network provides a slight bias for the base of transistor 70 with respect to the emitter, so that a small continuous bias current flows in the transistor. The collector of transistor 70 is connected through a potentiometer 76 and resistor 78 to ground and a bypass capacitor 80 is connected between the emitter and ground. The output of the second amplifier 20 is taken from the wiper of potentiometer 76 and applied through capacitor 82 to any additional required amplifier stages. As described in detail in Murrell and Henry application Serial No. 153,043, a threshold circuit is preferably employed which is inoperative for noise or weak signals but opened for signals which are strong enough to give accurate indications of vehicle velocity. The output of the threshold circuit 22 is applied to a circuit 24 which limits the signal to produce generally square waves of predetermined shape and these waves are integrated in an appropriate circuit to produce a D.C. voltage in conductor 84 which is directly proportional to the frequency of the audio signal at the output of detector 14. This D.C. voltage is applied to indicating means 26 and is measured by meter 46 which is calibrated by adjusting potentiometer 44. The meter circuit is connected to ground through a resistor 86.

The accuracy of meter 46 or the recorder connected to conductor 48 depends upon the operation of the wave-shaping and integrating circuits as well as the actual indicating devices. Thus, while the number of impulses applied to the wave-shaping circuit, that is the frequency of the Doppler signal, is directly and mathematically related to vehicle velocity, the analogue nature of the wave-shaping, integrating, and indicating circuits permits error in calibration. To avoid such error, it is necessary to regularly calibrate the circuitry and this is accomplished by actuating switch 16 to the lower position illustrated in FIG. 1. In this position, the output of the detector 14 is connected through conductor 60 and conductor 88 to a dummy load resistor 90 which permits the transmitter, receiver, and detector to operate in the normal fashion without damage to the detector and without alteration of any circuit parameters. The switch 16 when in its lower position also connects the transducer 28 to ground through shield 62 and thus a circuit is completed from ground through transducer 28 and capacitor 30 to the input of transistor 70.

By striking the tuning fork 32 to generate the standard known frequency of sonic energy, the electromechanical transducer 28, which is located on the face of the radar housing, is correspondingly driven and generates an electrical audio test signal of precisely known frequency. With this known frequency applied to the input of transistor 70, it is possible to calibrate the wave-shaping, integrating, and indicating circuits without leaving the police vehicle and with greatly improved speed and accuracy.

By "high frequency signals," as that term is used in this application, any signal is included which is appropriate for Doppler radar apparatus. As mentioned, 2,400 mc. and 10,000 mc. are typical approximate values which have been extensively used. The term "audio signal" as employed herein is intended to mean an electrical signal having a frequency representing the difference frequency between the transmitted and received signals. When operating in the 10,000 mc. range, this audio signal varies between about 314 and 3140 cycles per second although it should be clear that the term "audio signal" as used herein can include electrical signals within the desired low frequency range even though they might be below or above the typical response of the human ear and thus not audible. Where the term "indicating means" is used in this application, it is intended to include a meter, a recorder, or any other appropriate device which may be employed to indicate vehicle velocities including perhaps oscilloscopes or the like. As already mentioned above, the term "signal processing means" has been employed to generally indicate amplifiers, integrating circuits, frequency multipliers or dividers, or threshhold circuits or the like which may be desired to process the beat frequency before it is applied to the indicating apparatus. Where the term "sonic signal" is used herein, it is intended to include mechanical vibrations in the nature of sound waves in contrast to audio signals, which are herein defined as electrical signals. Sonic signals may be within the audible range or may be supersonic or ultrasonic as those terms are often used with respect to human hearing responses. "Altering" is used to describe the adjustment in the indicating device and this may include either the application of a bias current or voltage to the indicating device to render it more accurate over the useful range of the device or it may be used to encompass mechanical changes in the indicator to appropriately adjust and calibrate the entire apparatus. While the conventional calibrating system described and claimed herein has been related specifically to one traffic radar apparatus, it will be immediately apparent that the advantages set forth and the objects of the invention can be accomplished and attained with various circuit configurations and radar apparatus.

Without further elaboration, the foregoing will so fully explain the character of this invention that others may, by applying current knowledge, readily adapt the same for use under varying conditions of service, while retaining certain features which may properly be said to constitute the essential items of novelty involved, which items are intended to be defined and secured by the following claims.

What is claimed is:

1. A system for calibrating Doppler radar apparatus for use in determining the velocity of motor vehicles, said apparatus including a transmitter for directing a beam of high-frequency electromagnetic waves at such motor vehicles, receiving means for receiving said transmitted waves directly from said transmitter and said transmitted waves after said waves have been reflected from such vehicles, detector means effectively comparing said transmitted waves and said reflected waves to generate an audio signal having a frequency representative of the difference between said transmitted waves and said reflected waves, signal processing means energized from said detector means, and indicating means energized from said signal processing means to indicate the velocity of such a vehicle, said system comprising means for generating an audio test signal of a known frequency corresponding to a preselected velocity of such vehicle, said generating means including transducer means mounted within said apparatus, means for applying said audio test signal directly to said signal processing means, and means for altering said indicating means to read the vehicle velocity corresponding to said known frequency.

2. A system for calibrating Doppler radar apparatus for use in determining the velocity of motor vehicles, said apparatus including a transmitter for directing a beam of high-frequency electromagnetic waves at such motor vehicles, receiving means for receiving said transmitted waves directly from said transmitter and said transmitted waves after said waves have been reflected from such vehicles, detector means effectively comparing said transmitted waves and said reflected waves to generate an audio signal having a frequency representative of the difference between said transmitted waves and said reflected waves, signal processing means energized from said detector means, and indicating means energized from said signal processing means to indicate the velocity of such a vehicle, said system comprising generator means producing a sonic signal of known frequency, transducer means mounted within said apparatus for converting said sonic signal into an audio test signal of a frequency corresponding to that of said sonic signal, means for selectively applying said audio test signal directly to said signal processing means, means for altering said indicating means to read the relative velocity corresponding to said known frequency, and means selecting said audio test signal and rejecting said audio signal whenever said test signal is applied to said processing means.

3. Traffic radar apparatus for determining the velocity of a moving vehicle relative to said apparatus comprising a transmitter for high-frequency electromagnetic waves, receiving means for receiving said transmitted waves directly from said transmitter and said transmitted waves after said waves have been reflected from said moving vehicle, detector means effectively comparing said transmitted waves and the reflected waves in said receiving means to generate an audio signal having a frequency representative of the difference between the frequency of said transmitted waves and the frequency of said reflected waves, means for generating an audio test signal of a known frequency including transducer means mounted within said apparatus, signal processing means, means for selectively rendering said signal processing means responsive to either said audio signal or said audio test signal, indicating means energized from said signal processing means to indicate a relative velocity between said traffic radar apparatus and a moving vehicle for each frequency of said audio signal, and means for altering said indicating means to read the appropriate relative velocity corresponding to said known frequency when said audio test signal is applied thereto.

4. Traffic radar apparatus for determining the velocity of a moving vehicle relative to said apparatus comprising a transmitter for high-frequency electromagnetic waves, receiving means for receiving said transmitted waves after said waves have been reflected from said moving vehicle, detector means energized from said receiving means to generate an audio signal having a frequency corresponding to the difference between the frequency of said transmitted and received waves, means for generating a sonic signal of known frequency, transducer means mounted in said apparatus and energized by said sonic means to generate an audio test signal corresponding to said sonic signal, signal processing means, means for selectively applying either said audio signal or said audio test signal to said signal processing means, indicating means energized from said signal processing means to indicate a velocity, and means for altering said indicating means to read the appropriate relative velocity corresponding to said known frequency when said audio test signal is applied thereto.

5. Traffic radar apparatus for determining the velocity of a moving vehicle comprising a radar housing means, a remotely located transmitter unit, and interconnecting cables, said apparatus including a transmitter for high-frequency electromagnetic waves, a receiver for said high-frequency electromagnetic waves after they have been reflected from said vehicle, and detector means energized from said receiver to generate an audio signal having a frequency corresponding to the difference between the frequency of said transmitted and received waves, said transmitter, said receiver and said detector means being mounted in said transmitter unit, means for generating a sonic signal of known frequency, electromechanical transducer means mounted in said radar housing means and energized by said sonic means to generate an audio test signal corresponding to said sonic signal, signal processing means in said radar housing means, switch means in said radar housing means for selectively applying either said audio signal or said audio test signal to said signal processing means, indicating means associated with said radar housing means and energized from said signal processing means to indicate a velocity, and means associated with said indicating means for altering said indicating means to read the appropriate relative velocity corresponding to said known frequency when said audio test signal is applied thereto.

6. The traffic radar apparatus of claim 5 wherein said radar housing means is mounted within a vehicle and said transmitter unit is mounted externally of said vehicle.

References Cited by the Examiner
UNITED STATES PATENTS
3,143,736   8/1964   Midlock _____ 343—17.7

CHESTER L. JUSTUS, *Primary Examiner.*
RODNEY D. BENNETT, *Assistant Examiner.*